US006669478B2

(12) United States Patent
Edwards et al.

(10) Patent No.: US 6,669,478 B2
(45) Date of Patent: Dec. 30, 2003

(54) METHOD AND DEVICE FOR MULTI-SENSORY LEARNING

(76) Inventors: Ann Edwards, 9960 3rd Ave., Brooklyn, NY (US) 11209; Karen Goldberg, 236 Forest Ave., Glen Ridge, NJ (US) 07028

( * ) Notice: Subject to any disclaimer, the term of this patent is extended or adjusted under 35 U.S.C. 154(b) by 0 days.

(21) Appl. No.: 10/003,517

(22) Filed: Nov. 26, 2001

(65) Prior Publication Data

US 2003/0099920 A1 May 29, 2003

(51) Int. Cl.[7] .................................................. G09B 1/00
(52) U.S. Cl. ....................... 434/159; 434/162; 434/167; 434/317
(58) Field of Search ............................... 434/156–178, 434/317

(56) References Cited

U.S. PATENT DOCUMENTS

| | | | | |
|---|---|---|---|---|
| 3,774,319 A | * | 11/1973 | Sprowls | 434/164 |
| 3,869,813 A | * | 3/1975 | Hancy | 434/163 |
| 4,315,748 A | | 2/1982 | Frascara et al. | |
| 4,650,423 A | * | 3/1987 | Sprague et al. | 434/156 |
| 5,169,316 A | * | 12/1992 | Lorman et al. | 434/185 |
| 5,524,899 A | * | 6/1996 | Haqedorn | 273/299 |
| 5,769,639 A | | 6/1998 | Foster | |
| 5,788,503 A | * | 8/1998 | Shapiro et al. | 434/172 |
| 5,863,043 A | * | 1/1999 | Bitner | 273/299 |
| 5,899,698 A | * | 5/1999 | Sandlin | 434/157 |
| 5,993,217 A | | 11/1999 | Perry | |
| 6,030,225 A | | 2/2000 | Chan | |
| 6,050,824 A | | 4/2000 | Stuart | |
| 6,077,080 A | * | 6/2000 | Rai | 434/170 |

OTHER PUBLICATIONS

Phyllis Bertin & Eileen Perlman, A Multi–sensory Cirriculumfor teaching reading, 1998,p1 ,Monroe Ass. White Plains, NY, USA.
Gillingham & Stillman, Remedial Training for children with disability, 1956, p.29–30, Educators Pub. Cambridge, Mass. USA.
Montgomery, Angling for Words, The Teachers Line, 1975, p. 2,Academic Therapy Pub., Novata Calif. USA.
Fisher–Price, Inc., Preschool Learning Pad, 1998, p. 1998, p.7–9, Modern Pub., NY,NY, USA.
Rome & Osman,Advanced Language Tool Kit, 2000, p. 9, 13–14, Educators Pub. Ser. Inc.,Cambridge Mass. USA.

* cited by examiner

Primary Examiner—Derris H. Banks
Assistant Examiner—Bera B. Mo
(74) Attorney, Agent, or Firm—Mary A. Whiting, Esq.

(57) ABSTRACT

A method and device for teaching the pronunciation of the letters of the alphabet's phonetically correct sound, and recognition of name and shape, for learning reading and writing, utilizing the technique of multi-sensory tactile impressions. Illustrations of letters and their phonetically correct sounds are linked with commonly associated words. For example, the letter "s" is paired with an illustration of and the word "sun" to teach an unvoiced "s" sound; or paired with an illustration of and the word "rose" to teach a voiced "zzz" sound. The letter's textured surface is distinguishable from the pages' flat surface. While simultaneously tracing the letter's bumpy surface, the user vocalizes the letter's name, phonetically correct sound and associated word. Combinations of letters are used to blend sounds to form words. The same method can be used to teach number recognition and meaning.

16 Claims, 5 Drawing Sheets

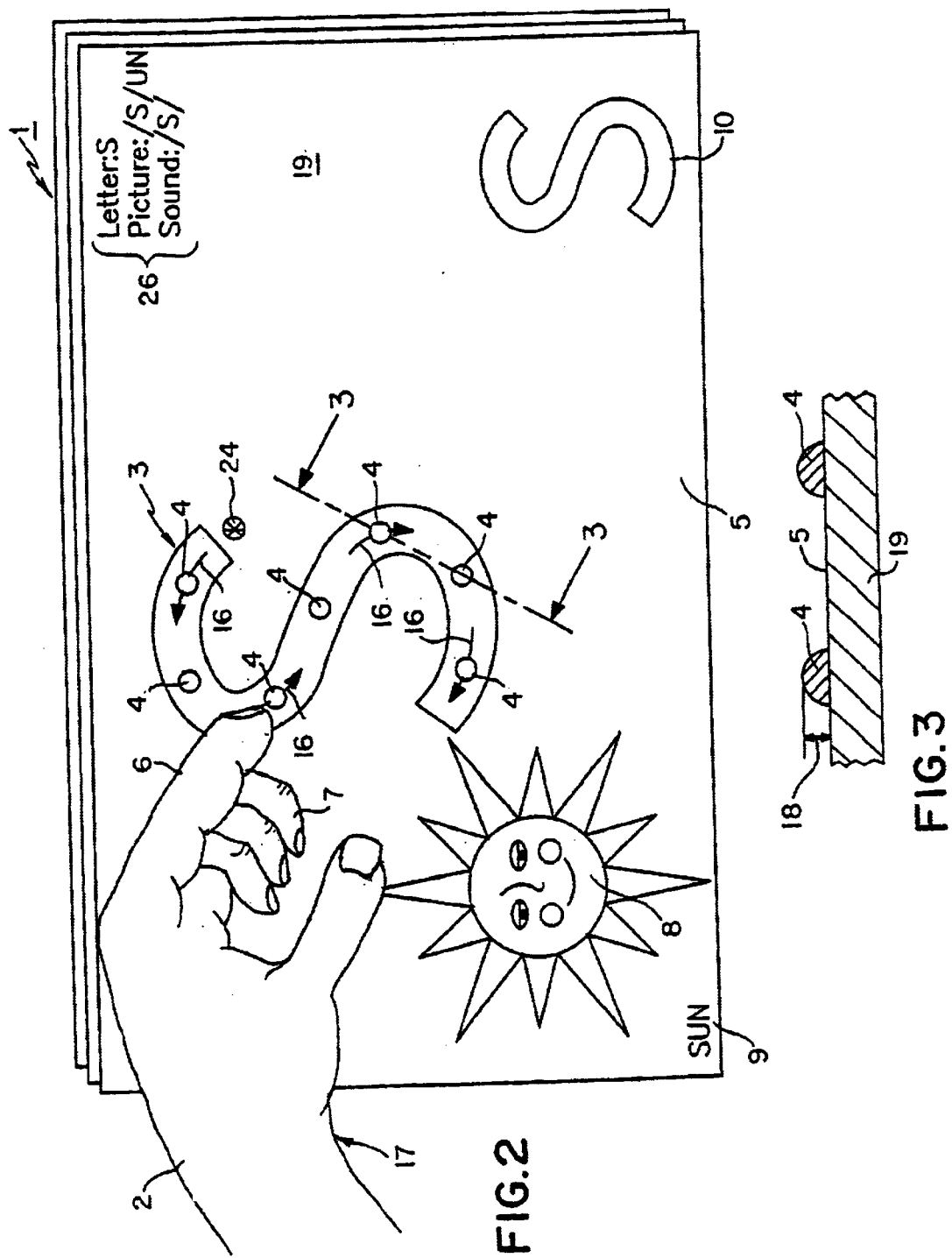

METHOD AND DEVICE FOR MULTI-SENSORY LEARNING

BACKGROUND

1. Field of the Invention

The present invention relates to a method and device preferably in book form to teach the association of a letter's (or combination of letters') alphabetical symbol(s) to its phonetically correct sound, shape and name, and, if a number, to teach the association of a number's numerical symbol to its shape, name and meaning, in order to facilitate the ability to read and write, utilizing tactile impressions to provide a secure and serviceable memory of letter and number form.

2. Description of the Prior Art

Prior Art devices disclose various devices for learning to read and/or mathematics; whereby the devices are toys, books or computer generated devices, and are designed to help children by either having partial page portions including a picture and letter cards, or computer generated cards or numbers. Some of these devices have different tactile feel for different letters, or a raised character display structure, utilizing Braille dotted textures.

There are several patents that disclose various educational devices with Braille textures. The present invention differs from these in that its texture is not Braille-based. The user of the present invention manually traces the form of the letter (or combination of letters) in one predetermined direction over the letter's (or combination of letters') bumpy raised texture in order to provide the user with a secure and serviceable memory of a letter's (or combination of letters') attributes (i.e. shape, phonetically correct sound, and name) and, if a number, its attributes of shape, name and meaning. Thus, the user learns to associate the letter(s) or number(s) with these attributes in order to learn to read and write.

The distinct, repeated kinesthetic movements of the user's fingers on the letter's bumpy surface provide impression on the user's nerve tissue that is not eradicated and thus committed to long-term memory. The method of the present device also transfers to the user correct letter or number formation when the user begins to write. Prior art patents concerning educational devices, but not containing the improvements of the present invention are as follows:

| Inventor | Patent Number | Date |
| --- | --- | --- |
| Chan, Yin Kit | U.S. Pat. No. 6,030,225 | Feb. 29, 2000 |
| Stuart, Gayle J. | U.S. Pat. No. 6,050,824 | Apr. 28, 2000 |
| Perry, Albert William | U.S. Pat. No. 5,993,217 | Nov. 30, 1999 |
| Shapiro, et. al. | U.S. Pat. No. 5,788,503 | Aug. 4, 1998 |
| Foster, Anne | U.S. Pat. No. 5,769,639 | Jun. 23, 1998 |
| Frascara, et. al. | U.S. Pat. No. 4,315,748 | Feb. 16, 1982 |

OTHER REFERENCES

1. "A Multi-sensory Curriculum for Teaching Reading, Spelling, and Handwriting in the Elementary Classroom, A PAF Program, Preventing Academic Failure", Phyllis Bertin and Eileen Perlman, Monroe Associates, White Plains, N.Y., USA, 1998, page-1.
2. "Remedial Training for Children with Specific Disability in Reading, Spelling and Penmanship", Anna Gillingham and Bessie W. Stillman, Educators Publishing Service, Inc., Cambridge, Mass., USA, 1956, page 29–30.
3. "Angling for Words, The Teacher's Line, The Teacher's Guide for Language Training", Dorothy B. Montgomery, Academic Therapy Publications, Novato Calif., USA, 1975, Pages 2.
4. "Advanced Language Tool Kit, Teaching the Structure of the English Language", Paula D. Rome, Jean S. Osman, Educators Publishing Service, Inc., "Multi-sensory Learning Approach," Cambridge, Mass., 2000, pages-9, 13–14.
5. Fisher-Price's "Preschool Learning Pad, On My Way to Reading", Modern Publishing, N.Y., N.Y., USA 1998, pages 7–9.

PRIOR ART REFERENCES

Chan, Yin Kit, U.S. Pat. No. 6,030,225 dated Feb. 29, 2000, is a raised character display structure for an educational toy for mathematics to learn counting. It is comprised of layers where the first characters may be viewed through the second character so that the user is provided with the illusion that the second character has the color and pattern of the first character. The present invention differs from Chan's invention since its user learns to read by tracing the bumpy texture of the character in a predetermined direction. There is no illusion of pattern. The bumpy pattern is on the surface of the present invention's letters.

Stuart, Gayle J., U.S. Pat. No. 6,050,824 dated Apr. 28, 2000 is a book to learn the letters of the alphabet containing representations of letters of the alphabet in upper and lower cases, wherein each page contains an upper and lower case letters. Each letter (both upper and lower case) has a different appearance and textural feel from the remaining 25 letters of the alphabet. Stuart's invention differs from the present invention in method and structure. The present invention is a device for learning to read, form words, write the letter or number correctly. Also, the present invention's letter's texture is a series of equally spaced bumps which the user's finger traces in one predetermined direction in order to associate the letters (or combination of letters) with sounds to learn to read. The texture of each letter is not differentiated. The bump of the pattern is uniform for each letter. This reinforces the student's remembrance of the letter and number with its associated sound, shape, name and meaning.

Perry, Albert William, U.S. Pat. No. 5,993,217, is a learning apparatus for use with a computer comprising a set of tactile cards with Braille dots embossed on its front surface. The computer displays a pre-selected graphic representation of Braille dots embossed on the card corresponding to the discrete keys stroke signal received at the keyport. The present invention differs from Perry's in that its bumpy pattern is not Braille, and the method of the present invention employs manual tactile senses of the user and is not computer generated.

Shapiro, et. al., U.S. Pat. No. 5,788,503, dated Aug. 4, 1998, is an educational device to help children read, which utilized partial page portions, which can be independently turned, each portion containing a turnable picture and letter cards with consonants, vowels, allowing for the child to make many pronounceable words of varying complexity. Shapiro's invention differs from the present invention since the tactile sense of the user is not deployed to aid the user's kinesthetic training, as it deployed in the present invention.

Foster, Ann, U.S. Pat. No. 5,769,639, dated Jun. 23, 1998, is an educational device that teaches mathematics and letters of the alphabet, phonics and consonant blends. The workpieces are in Braille with dots. The present invention differs from Foster's in that its bumpy texture is not Braille. The present invention employs a directional movement of the user's fingers in unison along the letter's bumpy texture with the pronunciation of the phonetically correct sound of the letter (or combination of letters) to learn the association of a letter (or combination of letters) with its attributes of shape, phonetically correct sound, and name, and, if a number, its attributes of name, shape and meaning in order to learn to read or write.

Similarly, while the cited books in the prior art teach multi-sensory learning, they do not combine the multi-sensory method and textured letter device of the present invention in order to teach reading and writing.

OBJECTS AND ADVANTAGES

Accordingly, besides the distinctions from the prior art stated above, several objects and advantages of the present invention are:

- To provide for a device wherein the learning of reading and writing by association of a letter (or combination of letters) with its attributes (shape, phonetically correct sound, and name), and, if a number, with its attributes of shape, name and meaning, is contained in one easily transportable form;
- To provide for a device wherein the teacher (usually an adult user) can become proficient in the devices method of teaching reading and writing quickly;
- To provide for a device wherein the teacher (usually an adult user) can become proficient in the device's method of teaching reading and writing without having to obtain prerequisite professional certifications or degrees;
- To provide for a device wherein the teacher (usually a layperson) utilizes the device's multi-sensory phonetic textbook style learning brought home or in a non-institutional educational setting to facilitate reading and writing;
- To provide for a device wherein the letters and/or numbers have a raised pattern, so as to be distinctly different in texture and kinesthetically recognizable to the user in order to provide impressions on the user's nerve tissue that are never fully eradicated from long term memory which allows for reinforcement of the correct letter and number formation when the user begins to read and write;
- To provide for a device wherein the simultaneous linkage of all intake pathways to the brain are utilized, once the user sees and hears as they make the letter's (or combination of letters') phonetically correct sounds with their mouth and trace its shape with their fingers, the user learns to relate the various attributes of a given letter(s) (i.e., shape, phonetically correct sound, name), and, if a number, its attributes of shape, name and meaning, thereby enabling the user to blend these sounds to form words in order to read and write;
- To provide for a device wherein the teacher (usually an adult) can have the child user seated on their lap, which position aids in increasing the child's attention span and facilitates learning.

BRIEF DESCRIPTION OF THE DRAWINGS

FIG. 2 illustrates a perspective view of the present invention showing a user's fingers tracing a selected letter's shape along its bumpy surface formed by raised structures in a preferred direction guided by directional arrows.

FIG. 3 illustrates a cross-sectional view of the device along a vertical plane showing the bumpy surface formed by raised structures and their height.

Figure 1:
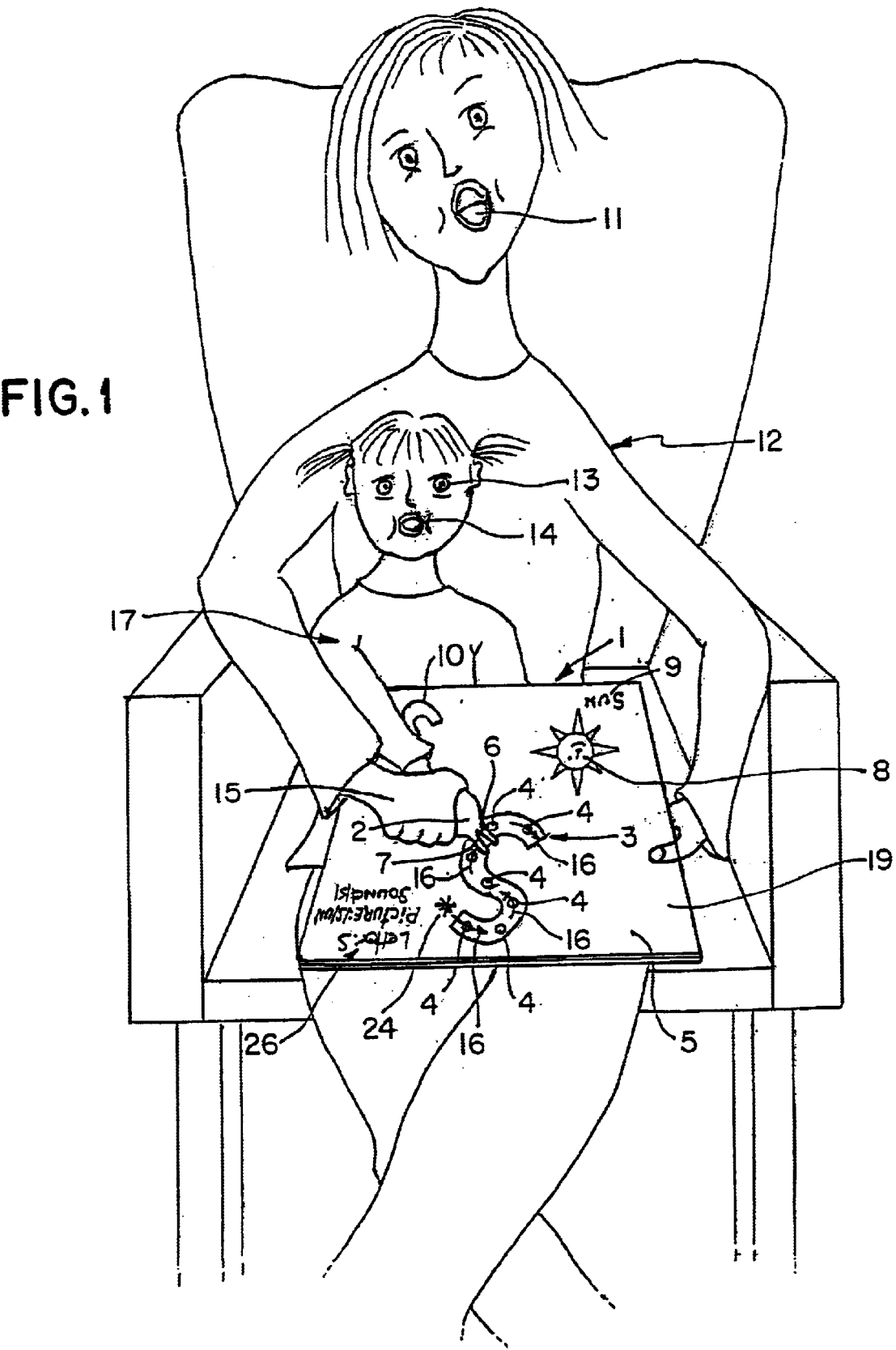
FIG. 1 illustrates a perspective view of the invention, showing a child user seated on an adult teacher's lap, using the device to trace a selected letter's (or combination of letters') shape in a preferred direction guided by directional arrows, starting at a point designated by a fanciful design (such as a star), while simultaneously saying the letter (or combination of letters), vocalizing the selected letter's (or combination of letters') phonetically correct sound, and pronouncing a commonly associated word (aided by its pictorial illustration).

| REFERENCE NUMBERS IN THE DRAWINGS | |
|---|---|
| 1. | Book |
| 2. | User's hand |
| 3 and 3'. | Letter with bumpy surface and combinations of letters |
| 4. | Raised structures |
| 5. | Book with planar surface |
| 6. | User's index finger |
| 7. | User's middle finger |
| 8. | Illustration of commonly associated word |
| 9. | Commonly associated word |
| 10 and 10'. | Letter with smooth surface and combination of letters |
| 11. | Teacher's mouth |
| 12. | Teacher |
| 13. | User's eyes |
| 14. | User's mouth |
| 15. | Teacher's hand |
| 16. | Directional arrows |
| 17. | User |
| 18. | Height of raised structure |
| 19. | Page |
| 20. | Number with bumpy surface |
| 21. | Pictorial illustration of numerical count |
| 22. | Spiral binding |
| 23. | Number with smooth surface |
| 24. | Starting points |
| 25. | Commonly associated word with a selected number |
| 26. | "Letter/Picture/Sound" Pneumonic device |

SUMMARY OF THE INVENTION

In accordance with all the objects and advantages of the invention stated above, a device is disclosed with utilizes the senses of sight, speech, hearing and touch of the user in order to learn to read and write. This device is especially helpful for children, as well as those with disabilities since it has been proven in scientific educational studies that these children learn more effectively using kinesthetic training. The invention is also helpful as an aid to teaching English As Second Language (ESL) students.

As an improvement over conventional kinesthetic techniques, such as methods using pieces of carpets and flash cards, the instant invention's raised structures or "bumps," which are traced by the user in a uniform predetermined direction (as guided by directional arrows drawn along the bumps), reinforces the user's recognition of the letter (or combination of letters) with its associated phonetically correct sound, shape and name (and, if a number with its shape, name and meaning). As the user progresses in its educational development, individual letters and sounds can be joined with numerous letters and sounds to blend into words. Pictorial illustrations of commonly associated words with the selected letter (or combination of letters) assist the user in associating the selected letter(s) with a word and the letter's (or combination of letters') phonetically correct sound. Included in the spelling of the commonly associated word is (are) the selected letter(s).

The combination of the user simultaneously 1) vocalizing the letter's (or combination of letters') phonetically correct sound, 2) pronouncing the letter's (or combination of letters') name, 3) pronouncing the commonly associated word with the phonetically correct sound illustrated by a picture, 4) hearing themselves make these sounds, while 5) repetitively and continuously making tactile impressions of the letter's (or combination of letters') shape with their finger(s), enables the user to commit the specific attributes (i.e. shape, phonetically correct sound, and name), of the letter (or combination of letters) into long term memory.

A pneumonic device depicting this sequence of "Letter/Picture/Sound" method of the invention is drawn on a consolidated space on the page for the user's reference. Once the user recognizes the relationship of this "Letter/Picture/Sound" pneumonic device with the associated letter (or combination of letters), the user can use the invention to further blend additional learned sounds into words. Thus the user will be prepared to learn to read and write. This increases the efficiency of learning as the distinct, repeated and continuous kinesthetic movements of the user's fingers along the letter's (or combination of letters') shape on its bumpy surface provides impressions on the nerve tissue of the users which are not easily eradicated and thus committed to long term memory. The learning disabled, as well as young children often have weak visual and auditory memories. They therefore come to rely heavily on tactile impressions to retrieve information. There is no pneumonic device for numbers.

For example, with this pneumonic device, the chosen letter (such as S), the picture of its chosen commonly associated word (sun) and its sound (/s/) are illustrated for the teacher. The illustrations of commonly associated words or common nouns associated with the selected letters are brightly colored and of such a level as to allow for user's quick recognition and lengthens their attention span. The bumpy pictorial illustrations of the numerical count associated with the selected number are similarly aesthetically pleasing as to be attractive to the user. When teaching the child user, the book's size and format facilitates the child to be seated in the adult teacher's lap, thus allowing for the adult to guide the child's fingers over the letters until the child can accomplish this unaided. Sitting in the adult's lap also gives the child a sense of security and allows for facilitating an improvement of the child's attention span and learning ability.

The book's form is preferably bound with a spiral binding, in order for the adult teacher to flip the pages to review the previously learned letters and/or numbers, which also facilitates an improvement of the child's attention span and learning ability. Also, the spiral binding allows the child to view only one page at a time. This allows the child to focus and concentrate on individual letters without being distracted. Summary pages at the end of the book give lists of words relating to each segment, for the student to practice, along with instructions for blending of the sounds into words.

DESCRIPTION OF THE PREFERRED EMBODIMENT OF THE INVENTION

The present invention will now be described in detail utilizing FIGS. 1–4. Referring to the drawings by numerals of reference, this invention relates generally to an educational device for teaching reading and writing to children and/or persons with learning disabilities or English As A Second Language (ESL) students. For example, as shown in FIG. 1, the device's book 1, is being used by the user 17, sitting on the teacher 12. The teacher's hand 15, guides the user's hand 2 over the raised structures 4a through 4g on the letter's 3 surface, and the user's index finger 6 (and, if needed, the user's middle finger 7) trace the letter 3 in a predetermined direction guided by the plurality of directional arrows 16a, 16b, 16c, and 16d, beginning at the starting point 24a designated by a fanciful design such as a star, (as further shown in detail in FIG. 2). As shown in FIG. 1, the user 17 and the teacher 12 say the name of the letter 3, and as shown on FIG. 2 the commonly associated word 9, (which is a commonly associated word, when spelled, has as its first letter the letter 3) and the letter's 3 sound. The user 17 and teacher 12 together form the letter's 3 sound with their mouths (14 and 11 respectively). As shown in more detail in FIG. 2, at the same time, they trace the letter's 3 shape, guided by the directional arrows 16a, 16b, 16c, and 16d which follow the pattern of the raised structures 4a through 4g. This kinesthetic learning method of distinct, repeated, movements of the user's index and middle fingers (6 and 7, respectively), together with a recognition of the shape of the user's mouth 14 and the sound of the letter 3 and the commonly associated word 9, provides impressions on the user's 17 nerve tissues that is not eradicated and thus commit the letter's and/or number's attributes (i.e., shape, sound, and name) and if a number also its value) to long-term memory. As further shown in FIG. 2, the brightly colored illustration 8 of the commonly associated word 9 further improves the user's 17 association of the letter 3 with a sound and commonly associated word 9, which teaches the user 17 to read and write. Letter 10 with a smooth surface (without a plurality of raised structures), is also pictorially illustrated in order for the user 17 to recognize the letters 3 and 10 as being the same letter of the alphabet and to recognize the sound the letter makes. This is reinforced when the user repeats the bumpy letter's 3 and smooth letter's 10 sound as being the same sound and visually recognize that they are the same letter. Shown in FIG. 3 in a cross-sectional view along a vertical plane is the height 18 of the plurality of raised structures 4e and 4f. Height 18 is sufficiently large to allow for a tactile distinction between raised structures 4e and 4f and the flat planar surface 5a of page 19a. The method of the instant device can also be used to teach number recognition and the concept of the numerical value associated with numbers. Shown in FIG. 4, the user's 17 index and middle fingers (6 and 7, respectively) trace the selected number's 20 shape guided by the directional arrows 16e, 16f and 16g following the pattern of the raised structures 4h through 4m. This directionality of the number 20 (or letter 3) when so traced encourages the user 17 to write these number 20 and/or letter 3 correctly in the future.

The method of the instant device can also be used to teach number recognition and meaning. Shown in FIG. 4, the user's 17 index and middle fingers (6 and 7, respectively) trace the selected numbers 20 shape guided by the plurality of directional arrows 16 following the pattern of the raised structures 4. This directionality of the number 20 when so traced encourages the user 17 to recognize and write number 20 correctly in the fixture. The method of the present invention is applied to learning numbers, their shape, name and meaning by the user 17 in order to recognize the number 20 and the commonly associated word 25 associated with that number 20. An illustration of a number of common objects 21 which also have a single raised structure 4 centrally located in each common object 21, matching the value of number 20, aids in teaching the meaning of numbers by associating the amount of common objects 21 with the selected number 20. Directional arrows 16 indicate which direction the user 17 should trace its fingers (6 and 7) along the common objects 21. For example, as further shown in FIG. 4, page 19 contains illustrations of number "2", and the commonly associated word "two" and a drawing of two fishes, with each fish having one bump on its surface.

Figure 4:
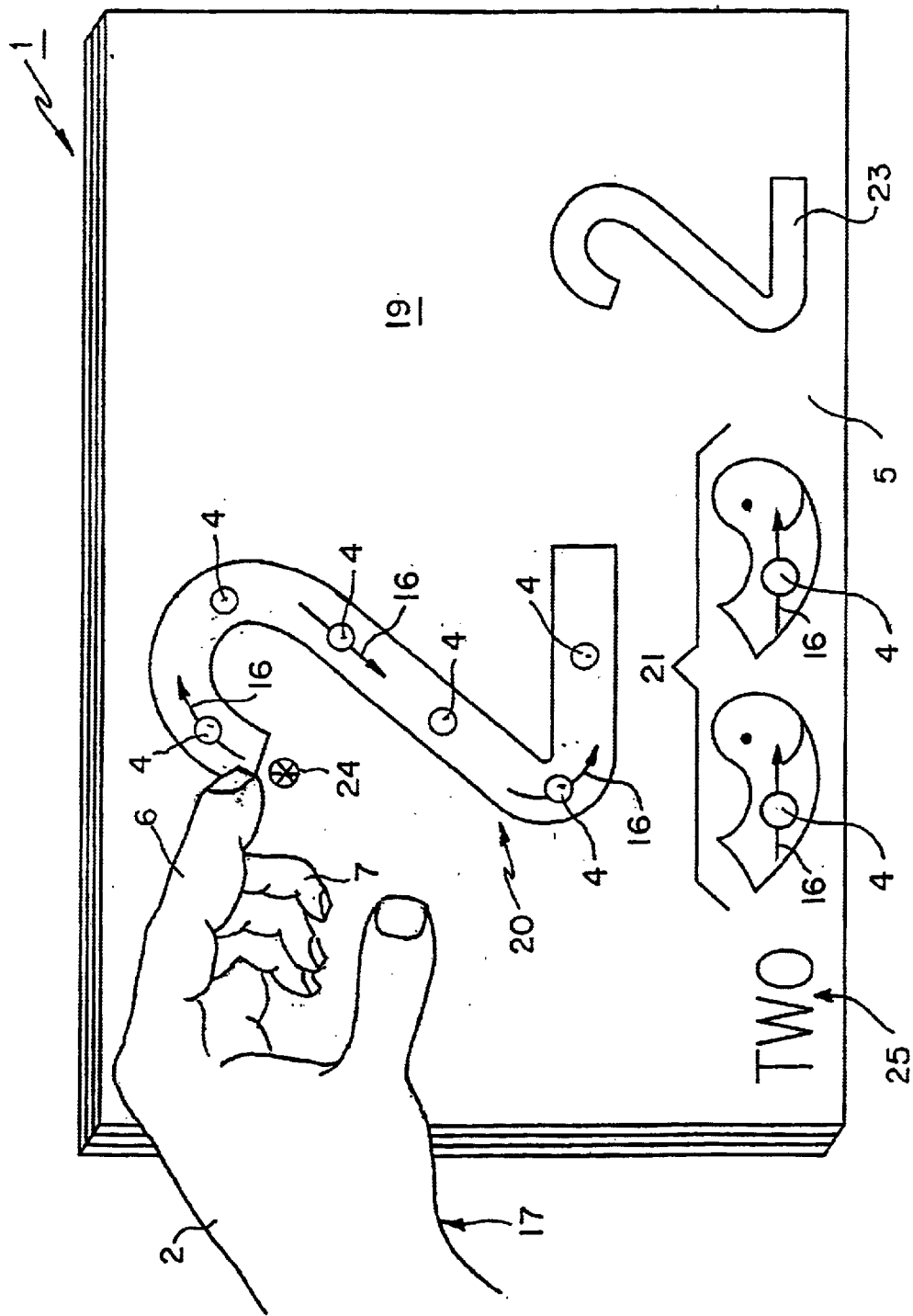
FIG. 4 illustrates a perspective view of the invention showing a use's finger's tracing a selected number's shape along the bumpy surface formed by raised structures in a preferred direction guided by directional arrows, which teaches the user number recognition, and further showing bumpy pictorial illustrations of a count of objects commonly associated with the selected number which teaches the user the meaning of the number.
Figure 5:
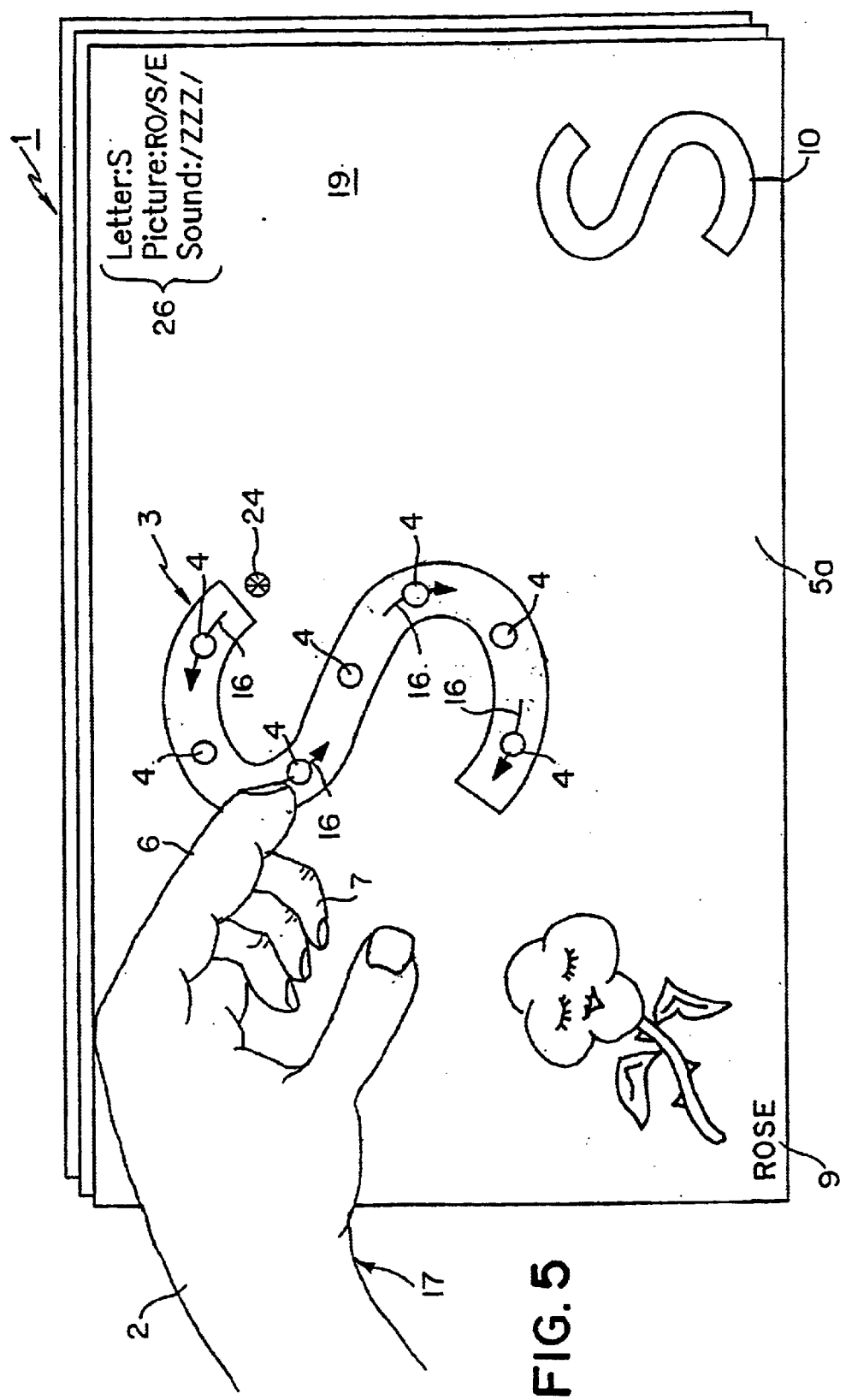
FIG. 5 illustrates a perspective view of the present invention showing a user's fingers tracing a selected letter's (or combination of letters') shape along its bumpy surface formed by raised structures in a preferred direction guided by directional arrows.
Figure 6:
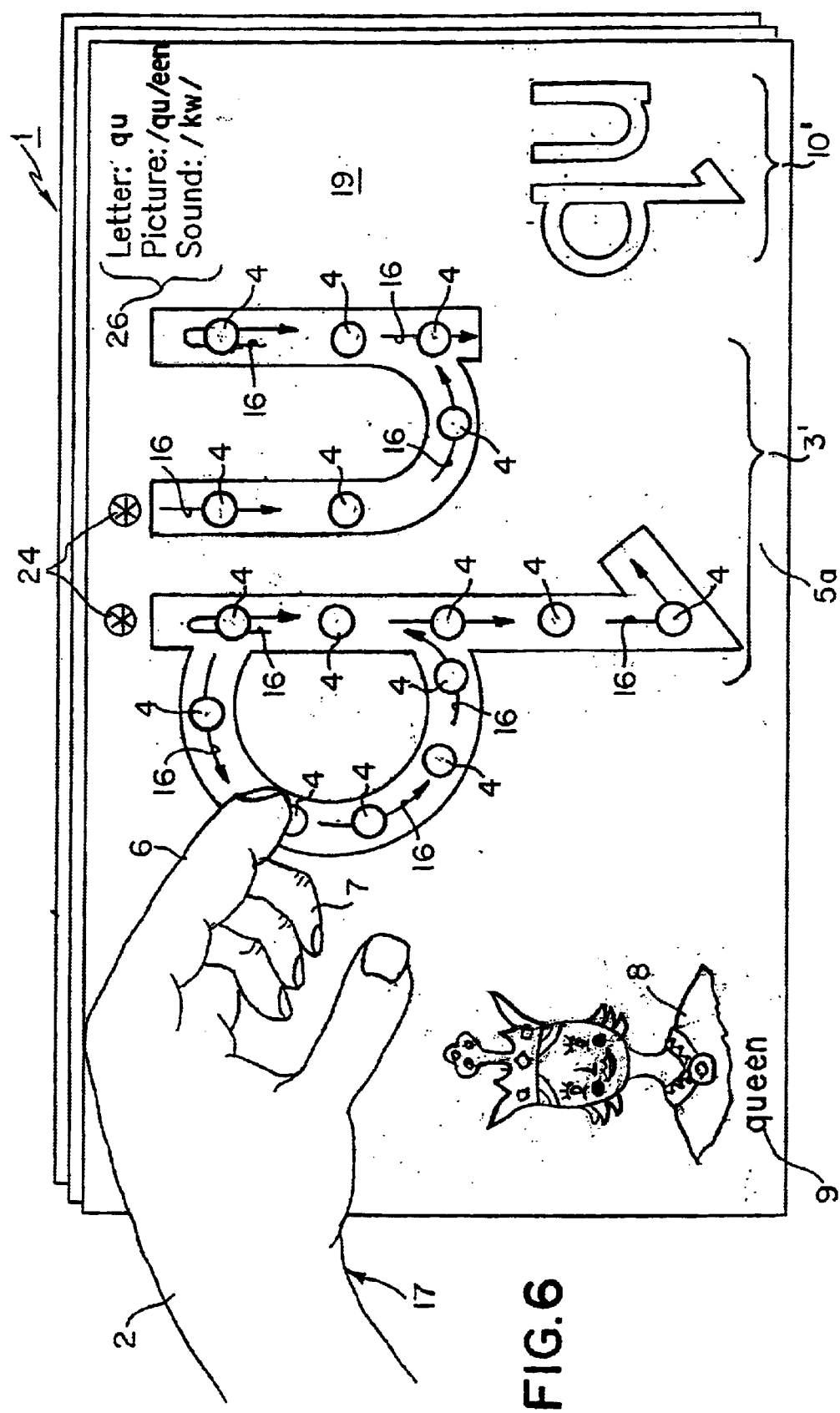
FIG. 6 illustrates a perspective view of the present invention showing a user's fingers tracing a selected combination of letters' shape along its bumpy surface formed by raised structures in a preferred direction guided by directional arrows.

As shown in FIGS. 1, 2 and 4, The device's 1 aesthetic appeal including the design of the bumpy letters 3, smooth letters 10, bumpy numbers 20, smooth numbers 23, commonly associated words 9 associated with letters, raised structures 4a through 4n, directional arrows 16a through 16g, pictorial illustration of numerical count 21, starting points 24a and 24b, and commonly associated words 25 associated with numbers, is derived from the colorful artwork which attracts and keeps the user's attention.

As shown in FIG. 1, a spiral binding 22 is the preferred binding since the users can flip between the different pages preferably one page at a time, which facilitates improvement of the users' attention span and learning ability (especially for children). This spiral binding also allows the teacher to review the previous letters and/or numbers learned with the user.

Those skilled in the art will understand that this description of the present invention provides the basis for numerous alternatives and modifications thereto. These other modifications are also within the scope of the present invention. Accordingly, the present invention is not limited to that as precisely shown and described in this application.

We claim:

1. A device for recognizing the shape, the pronunciation of the phonetically correct sound, and name of letters of the alphabet utilizing the technique of multi-sensory tactile impressions comprising:
   a plurality of pages, each of said pages containing an illustration of a letter's or combination of letters' shape, an illustration of a commonly associated word, and an illustration of a common object corresponding to said commonly associated word with said letter's or said combination of letters' phonetically correct sound;
   said letter or combination of letters' name, said commonly associated word, said illustration of common object corresponding to said commonly associated word, and said pronunciation of said phonetically correct sound are illustrated on each of said plurality of pages as a consolidated pneumonic device consisting of a sequence of letter, picture and sound;
   said illustration of said letter or combination of letters' shape further comprising a plurality of evenly proportioned raised structures evenly distributed along said letter's or said combination of letters' shape;
   wherein when a user repetitively and continuously traces its fingers in a predetermined directional path over said plurality of evenly proportioned raised structures in order to recognize said letter's or said combination of letters' shape, while simultaneously pronouncing and hearing said letter's or said combination of letters' phonetically correct sound, said name, and said commonly associated word, while simultaneously using said consolidated pneumonic device consisting of said sequence of letter, picture and sound over a sufficient number and duration of said repetitive and continuous tracing to facilitate the learning process;
   whereby said letters or said combination of letters' phonetically correct sound, said name, said shape, and said commonly associated word are imprinted into said user's memory to prepare said user to learn to read and write.

2. A device as described in claim 1, whereby drawn along said predetermined directional path over said plurality of evenly proportioned raised structures are arrows denoting the preferred direction of said user's fingers when repetitively and continuously tracing along said letter's or said combination of letters' shape.

3. A device as described in claim 1, whereby said evenly proportioned raised structures are positioned a predetermined distance apart so as to be aesthetically pleasing and to provide tactile impressions to aid memory.

4. A device as described in claim 1, whereby said evenly proportioned raised structures are of a predetermined height in order to be readily distinguishable from the flat surface of said pages.

5. A method for teaching the shape, pronunciation of the phonetically correct sound, and name of the letters of the alphabet utilizing the technique of multi-sensory tactile impressions, comprising:
   a plurality of pages, each of said pages containing an illustration of said letter's or said combination of letters' shape, an illustration of a commonly associated word, and an illustration of a common object corresponding to said commonly associate word with said letter or said combination of letters;
   said letter or combination of letters' name, said commonly associated word, said illustration of common object corresponding to said commonly associated word, and said pronunciation of said phonetically correct sound are illustrated on each of said plurality of pages as a consolidated pneumonic device consisting of a sequence of letter, picture and sound;
   said illustration of said letter or said combination of letters further comprising a plurality of evenly proportioned raised structures evenly distributed along said letter's or said combination of letters' shape;
   wherein said letter's or said combination of letter's phonetically correct sound, said name, said shape, and said associated word are imprinted into said user's memory to prepare said user to learn to read and write by use of a method comprising the following steps:
   a) repetitively and continuously tracing said user's fingers in a predetermined directional path over said plurality of evenly proportioned raised structures distributed along said letter's or said combination of letters' shape; and b) simultaneously pronouncing and hearing said letter's or said combination of letters' phonetically correct sound, said name and said commonly associated word, in order to relate said letter or said combination of letters with said phonetically correct sound, said name, said shape and said commonly associated word to each other, c) simultaneously using said consolidated pneumonic device consisting of said sequence of letter, picture and sound over a sufficient number and duration of said repetitive and continuous tracing to facilitate the learning process.

6. A method as described in claim 5, whereby drawn along said predetermined directional path over said plurality of evenly proportioned raised structures are arrows denoting the preferred direction of said user's fingers when repetitively and continuously tracing along said letter's or said combination of letter's shape.

7. A method as described in claim 5, wherein said evenly proportioned raised structures are positioned a predetermined distance apart so as to be aesthetically pleasing and to provide tactile impressions which aids memory.

8. A method described in claim 5, whereby the height of said evenly proportioned raised structures are of a predetermined height in order to be readily distinguishable from the flat surface of said pages.

9. A device for recognizing the shape, name and meaning of a plurality of numbers utilizing the technique of multi-sensory tactile impressions comprising:

a plurality of pages, each of said pages containing an illustration of said number's name, shape, and a predetermined number of illustrations of common objects corresponding to said number, said illustration of said number's shape further comprises a plurality of evenly proportioned raised structures evenly distributed along said number's shape, said illustration of said common objects further comprises a single evenly proportioned raised structure centrally distributed in each said common objects, whereby, when a user repetitively and continuously traces its fingers in a predetermined directional path over said plurality of evenly proportioned raised structures in order to recognize said number's shape; while simultaneously pronouncing and hearing said number's name in order to relate said number's shape with said number's name, said user learns number recognition, and when said user's fingers are repetitively and continuously traced over said single evenly proportioned raised structure distributed in each said illustration of common objects corresponding to said-number said user learns said number's meaning.

10. A device as described in claim 9, whereby drawn along said predetermined directional path over said plurality of evenly proportioned raised structures are arrows denoting the preferred direction of said user's fingers while tracing along said numbers' shape.

11. A device as described in claim 9, whereby said evenly proportioned raised structures are positioned a predetermined distance apart so as to be aesthetically pleasing and to provide tactile impression which aids memory.

12. A device as described in claim 9, whereby said evenly proportioned raised structures are of a predetermined height in order to be readily distinguishable from the flat surface of aid pages.

13. A method for recognizing the shape, name and meaning of a plurality of numbers utilizing the technique of multi-sensory tactile impressions comprising:

a plurality of pages, each of said pages containing an illustration of said number's name, shape, and a predetermined number of illustrations of common objects corresponding to said number, said illustration of said number's shape further comprising a plurality of evenly proportioned raised structures evenly distributed along said number's shape, said illustration of said common objects further comprises a single evenly proportioned raised structure centrally distributed in each said illustration of common objects, wherein a user learns number recognition and meaning by use of said method comprising the following steps:

(a) repetitively and continuously tracing said user's fingers in a predetermined directional path over said plurality of evenly proportioned raised structures in order to recognize said number's shape, while simultaneously pronouncing and hearing said number's name; and (b) repetitively and continuously tracing said user's fingers in a predetermined directional path over said single evenly proportioned raised structure distributed in each said illustration of common objects corresponding to said numbers meaning.

14. A method as described in claim 13, whereby drawn along said predetermined directional path over said plurality of evenly proportioned raised structures or said single evenly proportioned raised structure area arrows denoting the preferred direction of said user's fingers while repetitively and continuously tracing said number's shape.

15. A method as described in claim 13, whereby said plurality of evenly proportioned raised structures are positioned a predetermined distance apart so as to be aesthetically pleasing and to provide tactile impression which aids memory.

16. A method as described in claim 13, whereby said plurality of evenly proportioned raised structures and said single evenly proportioned raised structure are of a predetermined height in order to be readily distinguishable from the flat surface of said page.

* * * * *